(12) United States Patent  (10) Patent No.: US 7,730,701 B1
Ehrhart et al.  (45) Date of Patent: Jun. 8, 2010

(54) VARIABLE SPEED HYDRAULIC CONDITIONER DRIVE

(75) Inventors: Philip J. Ehrhart, Narvon, PA (US); D. Russell Whitenight, Benton, PA (US); Luke J. Harris, Leola, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/416,510

(22) Filed: Apr. 1, 2009

(51) Int. Cl.
*A01D 69/00* (2006.01)

(52) U.S. Cl. .............................. 56/11.9; 60/484; 60/431; 60/445

(58) Field of Classification Search ................... 56/11.9, 56/11.2, 14.5, 229, 168, 257; 460/20; 60/445, 60/484, 448, 447, 449, 431
See application file for complete search history.

(56) References Cited

U.S. PATENT DOCUMENTS

| | | | |
|---|---|---|---|
| 4,585,042 A * | 4/1986 | Hutson | 144/208.8 |
| 5,778,644 A | 7/1998 | Keller et al. | |
| 5,791,128 A * | 8/1998 | Rogalsky | 56/14.5 |
| 6,247,296 B1 * | 6/2001 | Becker et al. | 56/11.2 |
| 6,425,232 B1 | 7/2002 | Desnijder et al. | |
| 6,430,905 B2 | 8/2002 | Eis et al. | |
| 6,659,378 B2 | 12/2003 | Di Anna | |
| 6,718,744 B2 | 4/2004 | Rosenbalm et al. | |
| 6,775,966 B2 | 8/2004 | Frego | |
| 6,895,734 B2 * | 5/2005 | Ameye | 56/10.8 |
| 7,036,296 B2 | 5/2006 | Wübbels | |
| 7,140,169 B2 | 11/2006 | Ameye et al. | |
| 7,467,505 B2 * | 12/2008 | MacGregor | 56/11.9 |
| 7,497,069 B2 * | 3/2009 | Enns et al. | 56/11.9 |
| 7,640,718 B2 * | 1/2010 | Altepost et al. | 56/11.2 |
| 2004/0065070 A1 | 4/2004 | Dunn | |
| 2008/0295478 A1 * | 12/2008 | Majkrzak | 56/257 |

* cited by examiner

*Primary Examiner*—Árpád Fábián-Kovács
(74) *Attorney, Agent, or Firm*—Patrick M. Sheldrake; John William Stader; Michael G. Harms

(57) ABSTRACT

A hydraulic driver for powering the conditioner mechanism on an agricultural mower-conditioner, the hydraulic driver being powered by the same hydraulic power circuit that powers the cutting mechanism, but which includes controls for varying the speed and/or direction of rotation of the conditioner mechanism independent from the speed of the cutting mechanism.

19 Claims, 3 Drawing Sheets

VARIABLE SPEED HYDRAULIC CONDITIONER DRIVE

BACKGROUND OF THE INVENTION

The present invention relates generally to agricultural mower-conditioner drive components, and more particularly relates to a variable-speed hydraulic drive apparatus for the conditioner rolls in an agricultural mower-conditioner.

Windrower mower-conditioner combinations are well known and typically comprise a cutting mechanism, a conditioning unit, and one or more deflectors to arrange the cut and conditioned crop material into a windrow. The windrower mower-conditioner combination is generally a self-propelled unit, but may also be configured to be propelled by a separate tractor. Typically, a standing crop is cut by a sickle bar or a rotating disc cutting mechanism disposed along a leading edge of the combination. The severed crop material is then directed to a conditioner unit that processes the crop for faster drying. The conditioner unit may comprise a pair of intermeshing rolls that crush the crop material passing therebetween, or a flail that breaks and scratches the crop through impact. For background information on the structure and operation of some typical disc mower-conditioners, reference is made to U.S. Pat. No. 5,778,647, issued to McLean et al., the descriptive portions thereof being incorporated herein by reference.

Disc mower-conditioners normally include one or more hydraulic motors to drive the cutting mechanism. In a disc cutter, the hydraulic motors operate at the same speed as the discs eliminating the need for reduction gearboxes between the hydraulic motors and the cutting discs. It is typical to provide an additional output driven by the hydraulic motor, but which includes a reduction gearbox for driving the conditioner rolls. This approach requires a driveline between the hydraulic drive gearbox output shaft and the conditioner rolls. Furthermore, this approach fixes the relative rotational speeds of the disc cutters and the conditioner rolls through the reduction gearbox and does not allow for independent variations in conditioner roll speed.

Obtaining the most efficient crop conditioning performance requires proper matching of the conditioner mechanism speed to the specific crop conditions. Improper conditioner mechanism speed can have an adverse affect on the way in which crop is fed into the conditioner rolls, the configuration of the resultant windrows, fuel economy, and even the condition of the crop, wherein excessive conditioner roll speed tends to excessively damage the crop material. Varying the conditioner mechanism speed in typical mower-conditioner drives requires changing drive pulleys to alter the drive ratio between the hydraulically-driven gearbox output and the conditioner rolls, an adjustment that cannot easily be performed during operation.

It would be advantageous to have a hydraulic drive for the conditioner mechanism in an agricultural mower-conditioner to reduce the cutting mechanism and conditioner mechanism drivetrain complexity. Further advantages would be realized by providing separate hydraulic drives for the cutting and conditioner mechanism that would allow variation in the relative speed of the two mechanisms thereby enabling each to be individually optimized.

SUMMARY OF THE INVENTION

Accordingly, the present invention, in any of the embodiments described herein, may provide one or more of the following advantages:

It is an object of the present invention to provide a hydraulic motor for driving the conditioner mechanism on an agricultural mower-conditioner in addition to the hydraulic motor used to drive the cutting mechanism.

It is a further object of the present invention to eliminate the need for a mechanical drive mechanism for delivering power from a cutting mechanism drive apparatus to the conditioner mechanism.

It is a further object of the present invention to provide separate hydraulic drivers for the cutting and the conditioning mechanisms on an agricultural mower conditioner that may utilize existing hydraulic power supplies on the machine.

It is a still further object of the present invention to provide at least one hydraulic drive apparatus for the conditioner mechanism on an agricultural mower-conditioner that utilizes existing hydraulic power supplies on the machine, but provides a means of control that is separate from the control of hydraulic drivers for the cutting mechanism.

It is a still further object of the present invention to provide a hydraulic drive apparatus for the conditioner device of an agricultural mower-conditioner that enables the conditioner mechanism to be operated independently from the cutting mechanism thereby enabling the conditioner mechanism to be stopped and/or reversed to clear jammed materials without affecting operation of the cutting mechanism.

It is a still further object of the present invention to provide a hydraulic drive for a conditioner mechanism that is durable in construction, inexpensive of manufacture, carefree of maintenance, easily assembled, and simple and effective to use.

These and other objects are achieved in accordance with the instant invention by providing a hydraulic driver for powering the conditioner mechanism on an agricultural mower-conditioner, the hydraulic driver being powered by the same hydraulic power circuit that powers the cutting mechanism, but which includes controls for varying the speed and/or direction of rotation of the conditioner mechanism independent from the speed of the cutting mechanism.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward"

orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
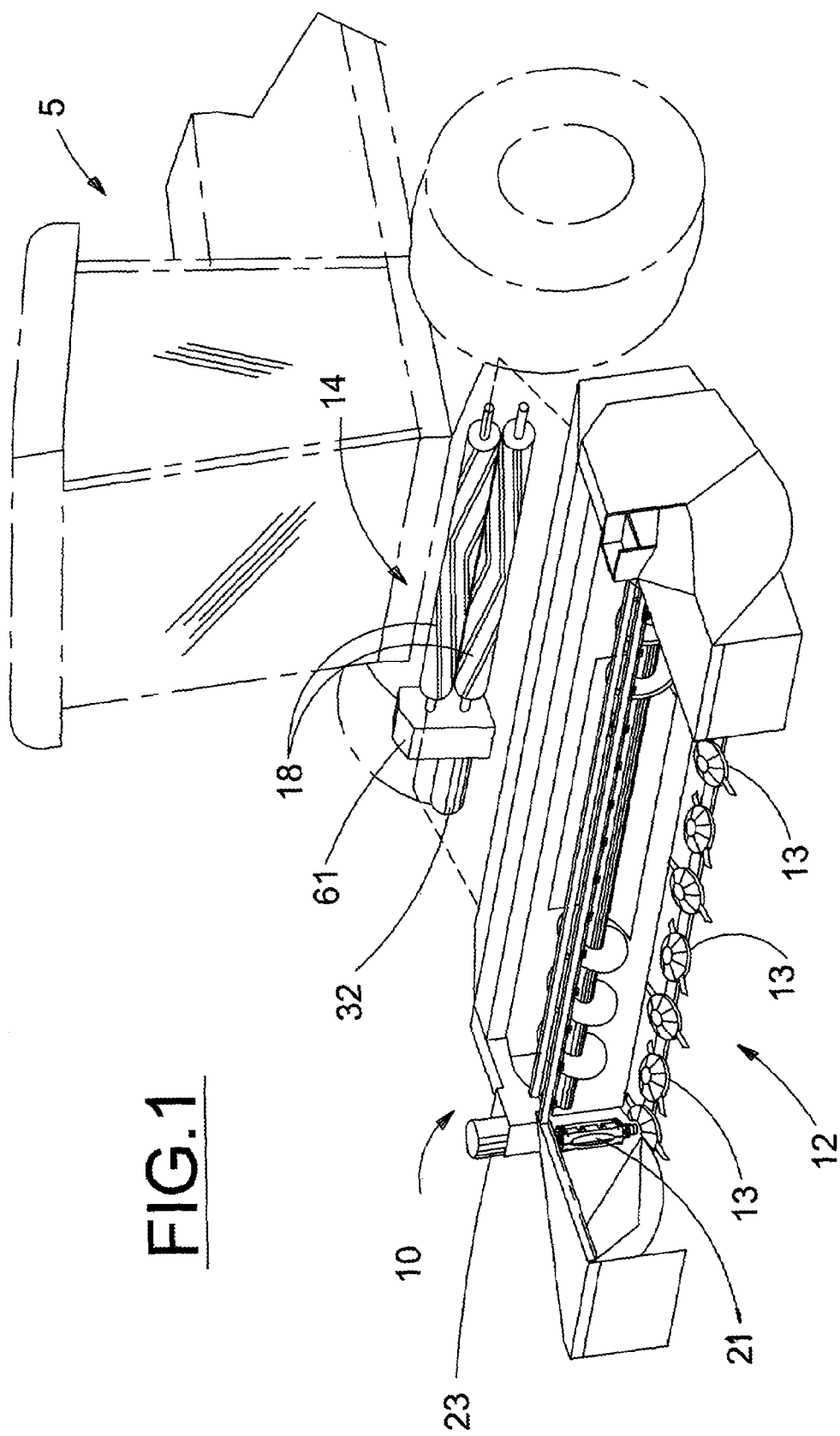
FIG. 1 is a forward perspective view of a mower-conditioner header of the type on which the present invention is useful.

Referring now to FIG. 1, a typical mower-conditioner header 10 is presented. The header 10 is provided with a crop cutting mechanism 12, also referred to as a cutterbar, having a plurality of transversely spaced disc cutter members 13 operable to sever standing crop material by an impact action. The individual disc cutter members are interconnected by a driveline to coordinate the rotational position of each cutter mechanism thereby preventing contact between the knives of adjacent cutting members. A conditioning mechanism 14 is mounted in the header 10 rearwardly of the cutterbar 12 to receive and condition crop material severed by the cutterbar. Header 10 may be connected to and propelled by a tractor 5 specifically adapted for use with such headers, commonly referred to as a self-propelled windrower, or the elements of header 10 may be incorporated into a mower-conditioner implement for propulsion by a general purpose agricultural tractor. The description herein is based upon a mower-conditioner header typical of an agricultural windrower. Those skilled in the art will recognize the usefulness of the instant invention on other mower-conditioner platforms. For background information on the structure and operation of an exemplar rotary disc cutterbar, reference is made to U.S. Pat. No. 5,778,647, issued to McLean et al., the descriptive portions thereof being incorporated herein by reference.

The conditioning mechanism 14 includes a pair of cooperable, generally vertically spaced apart transverse conditioner rolls 18 operable to condition severed crop material passing therebetween. Each roll 18 is rotatably supported adjacent opposing sides of the header 10. Rotation of the rolls 18 is coordinated for counter-rotational movement by a conditioner gearbox 61, usually connected at one end of the rolls. The preferred embodiment of the conditioner roll construction shown in FIG. 1 includes an intermeshing lug design on the roll surfaces.

Figure 2:
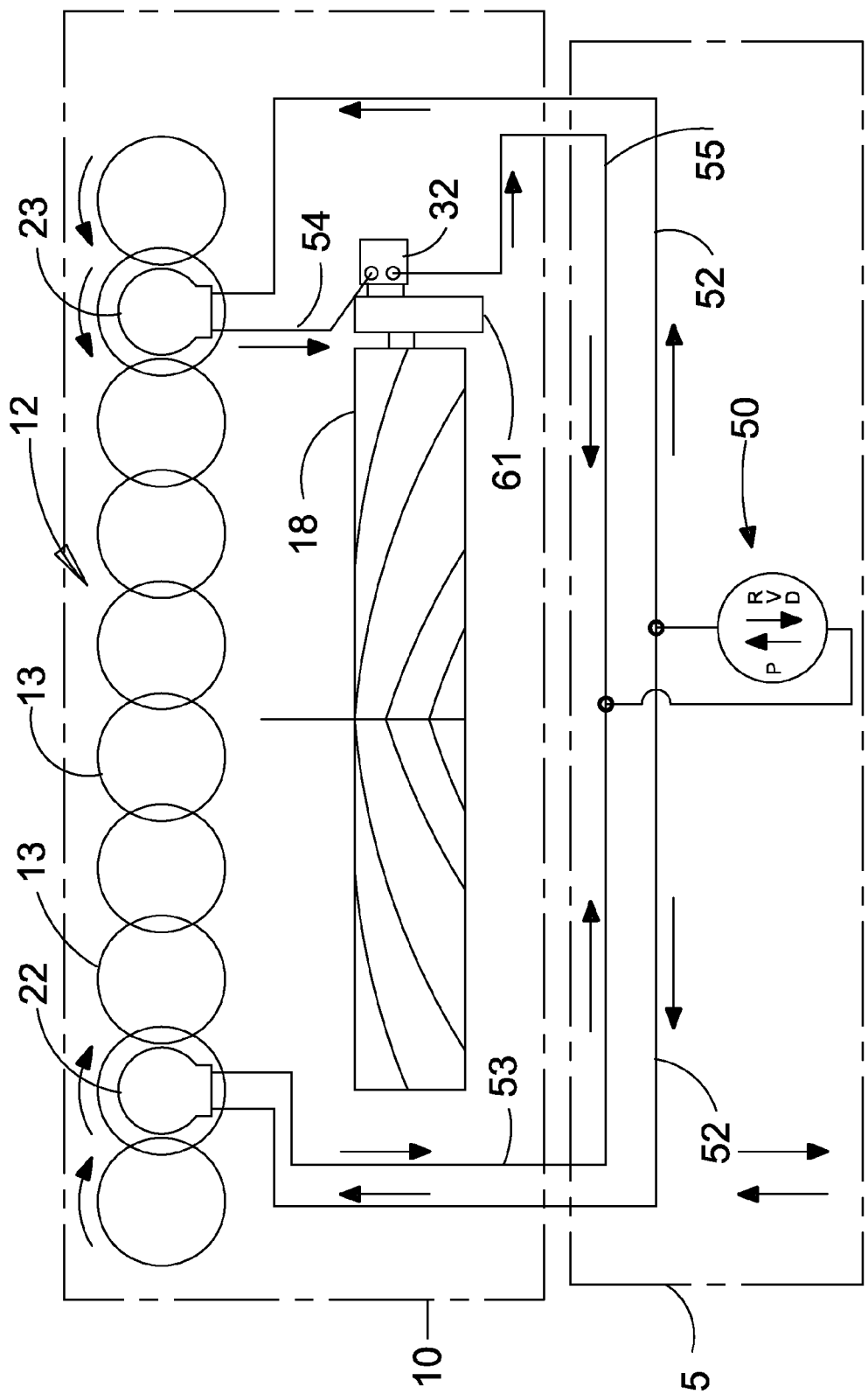
FIG. 2 is a plan diagram of one embodiment of a hydraulic circuit used in the present invention.

Now referring to FIG. 2, wherein a diagram of header 10 shows the cutterbar 12 comprising a plurality of disc cutter members 13. The individual cutting members are linked to coordinate the rotational position of the cutting knives of adjacent members and prevent contact between knives. The cutterbar 12 is powered by a pair of drivers 22, 23, each connected by a drive shaft 21 or similar torque transfer mechanism to an individual disc cutter member. The first and second cutterbar drivers 22, 23 are typically directly coupled to the disc cutters; no reduction gearboxes are usually employed in order to reduce complexity of the cutterbar drive. The first and second cutterbar drivers 22, 23 are typically positioned proximate to the outboard ends of the header to equalize the torque distribution along the length of the cutterbar. In the embodiment shown, cutterbar drivers 22, 23 are hydraulic motors powered by a hydraulic power system 50 on the tractor 5 conveying a flow of pressurized hydraulic fluid through hydraulic supply 52 and return 53, 54, 55 lines. It is typical for the two cutterbar drivers 22, 23 to be hydraulically connected to the hydraulic power system 50 using parallel hydraulic circuits. Cutterbar hydraulic drive systems, including hydraulic drivers (motors) on agricultural harvesters are well known and not discussed in further detail herein.

Known conditioner drive mechanisms generally connect mechanical drive to one of the cutterbar hydraulic drivers to convey power to a conditioner gearbox 61. In the present invention, a separate conditioner hydraulic driver 32 is provided to power the conditioner gearbox 61 and connected conditioner rolls 18 and replacing the comparatively bulky mechanical drivetrain extending from the cutterbar driver to the conditioner gearbox, yet still requiring a single hydraulic circuit to provide motive power to the header components. Conditioner driver 32 is hydraulically connected to the hydraulic circuit for one of the hydraulic cutterbar drivers so that the conditioner driver 32 operates when hydraulic flow is provided to the cutterbar driver. The speed relationship between the disc cutter members 13 and the conditioner rolls 18 is established and managed using the conditioner gearbox 61 ratio and the hydraulic driver displacements.

Figure 3:
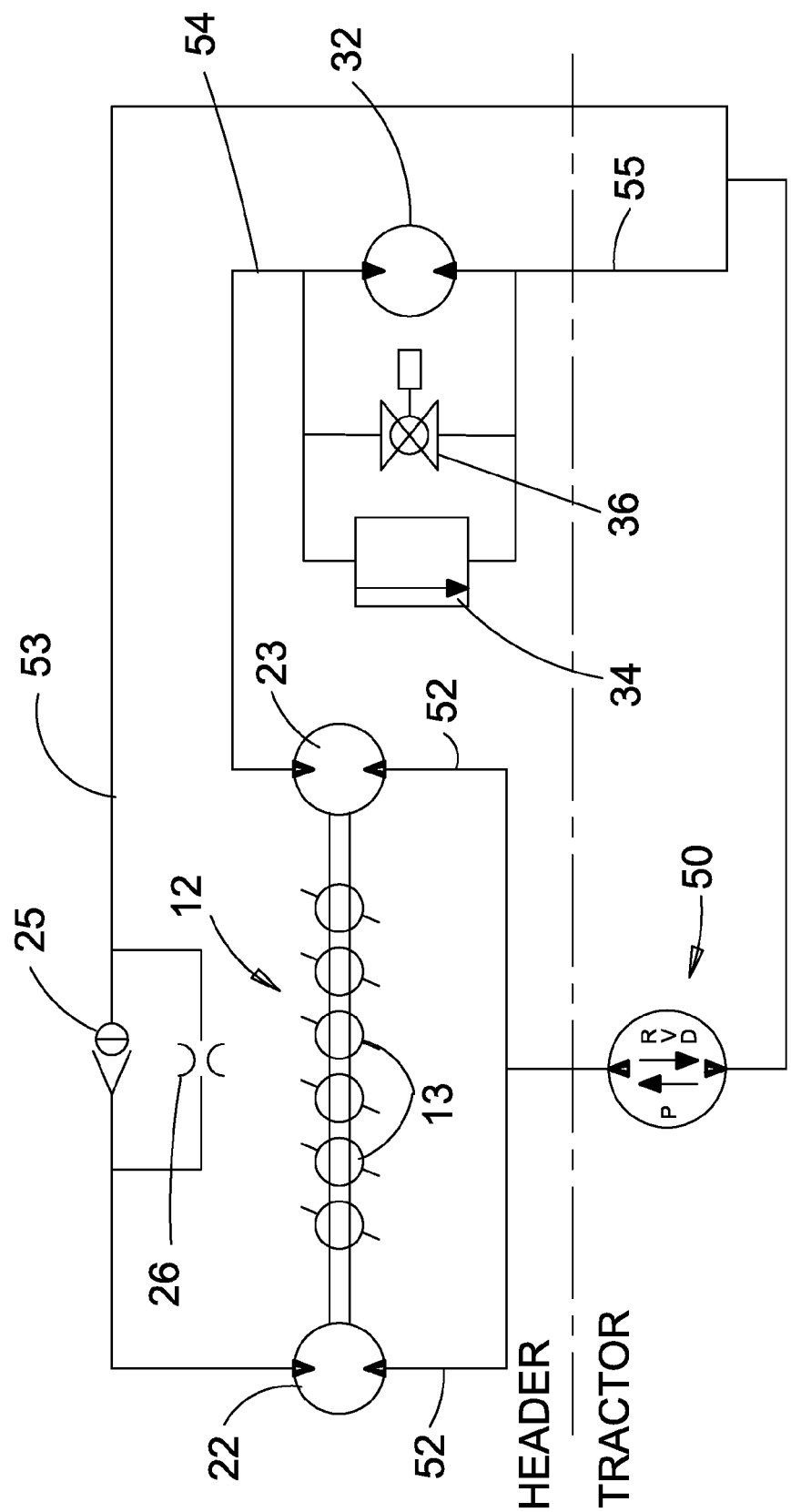
FIG. 3 is a schematic diagram of an alternate embodiment of the hydraulic circuit of the present invention.

Now referring to FIG. 3 with reference to FIG. 2, the hydraulic circuit is shown to further comprise a check valve 25 with an orifice 26 connected in parallel positioned in the return flow circuit 53 for one of the cutterbar drivers and a relief valve 34 connected in parallel with the conditioner driver 32. In the embodiment shown, the check valve 25 and orifice 26 are connected in the return circuit 53 for the first cutterbar driver 22, the driver hydraulic circuit not directed through the conditioner driver 32. This configuration prevents damage to the hydraulic circuit in the event the conditioner mechanism becomes clogged with crop material. As the conditioner mechanism jams, the conditioner driver 32 stops and blocks hydraulic fluid flow through return leg 54. However, since the individual disc cutter members are mechanically interconnected, first cutterbar driver 22 drives second cutterbar driver 23 through the disc cutter members, effectively operating second cutterbar driver 23 as a pump. With the conditioner driver 32 blocked, the hydraulic return line 54 between second cutterbar driver 23 and the conditioner driver 32 becomes quickly overpressurized. Relief valve 34 prevents damage by allowing the highly pressurized hydraulic fluid to bypass the jammed conditioner driver 32 and be returned to the tractor hydraulic system 50. Check valve 25 and bypass orifice 26 restrict the flow of hydraulic fluid through first cutterbar driver 22 when the flow direction is reversed (by reversing flow from the tractor hydraulic system 50) to move the conditioner mechanism in reverse and clear the jam.

Also shown in FIG. 3 is a variable flow diverter valve 36 which allows the flow of fluid through conditioner driver 32 to be adjusted. As shown in FIG. 3, the diverter valve may be used to adjust the bypass flow around the driver 32. By incorporating this element into the hydraulic circuit, the relative speed between the curretbar drivers 22, 23 and the conditioner driver 32 may be adjusted thereby enabling an optimum conditioner speed for the crop conditions to be easily obtained. Such adjustment may be performed during operation of the harvester instead of requiring changes to driveline components, such as pulleys. Similar conditioner mechanism speed adjustment may be obtained by selecting a variable displacement hydraulic motor for use as conditioner driver 32.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the descrip-

Having thus described the invention, What is claimed is:

1. A drive apparatus for a mower-conditioner mechanism in an agricultural harvester, the harvester having a tractor for propelling the mechanism across a field of standing crop and a hydraulic power supply, the mower conditioner mechanism having a forwardly disposed cutterbar mechanism and a conditioner mechanism having conditioning rolls disposed rearwardly therefrom, the drive apparatus comprising:
   a first and second cutterbar driver for providing rotational motive power to the cutterbar mechanism;
   a conditioner driver for providing rotational motive power to the conditioning rolls; and
   a hydraulic fluid circuit for conveying a flow of pressurized hydraulic fluid from the hydraulic power system through said at least one cutterbar driver and said conditioner driver, said at least one cutterbar driver and said conditioner driver being serially connected in said hydraulic fluid circuit, said first and second cutterbar drivers being connected to said fluid circuit in a parallel arrangement and said conditioner driver is connected in series with said first cutterbar driver.

2. The drive apparatus of claim 1, wherein said first and second cutterbar drivers are mechanically connected through the cutterbar mechanism.

3. The drive apparatus of claim 1, further comprising a pressure relief device for directing said flow of hydraulic fluid to bypass said conditioner driver when said conditioner driver stalls due to a clog of crop material in the conditioning rolls thereby preventing damage to said fluid circuit and the hydraulic power system.

4. The drive apparatus of claim 3, wherein said conditioner driver is configured for operation in a forward direction and an opposing reverse direction, and hydraulic fluid circuit is configured for providing pressurized hydraulic fluid to said conditioner driver in a manner to enable selective rotation of said conditioner driver in said forward direction or said reverse direction.

5. The drive apparatus of claim 4, wherein said hydraulic fluid circuit further comprises a bypass loop and a selectively adjustable control valve for diverting a selectively variable portion of said pressurized hydraulic fluid from said conditioner driver thereby enabling variation in the rotational speed of said conditioner driver independent of variation in the flow of the hydraulic fluid in the fluid circuit.

6. The drive apparatus of claim 4, wherein said conditioner driver is a variable displacement hydraulic motor thereby enabling variation in the rotational speed of said conditioner driver independent of variation in the flow of the hydraulic fluid in the fluid circuit.

7. A method for driving a cutter mechanism and a conditioner mechanism in an agricultural windrower, the windrower having a tractor for supporting and propelling a header across a field of standing crop, a hydraulic power supply, the header having a forwardly disposed cutterbar mechanism and the conditioner mechanism having conditioning rolls disposed rearwardly therefrom, the method comprising the steps:
   providing a first cutterbar driver and a second cutterbar driver for providing rotational motive power to the cutterbar mechanism;
   providing a conditioner driver for providing rotational motive power to the conditioning rolls;
   providing a hydraulic fluid circuit for conveying a flow of pressurized hydraulic fluid from the hydraulic power system through the at least one cutterbar driver and the conditioner driver, the at least one cutterbar driver and the conditioner driver being serially connected in said hydraulic fluid circuit;
   connecting the first and second cutterbar drivers to said fluid circuit in a parallel arrangement and connecting the conditioner driver in series with the first cutterbar driver whereby the first and second cutterbar drivers provide motive power to the cutterbar mechanism;
   engaging the hydraulic power supply and directing the flow of hydraulic fluid through the fluid circuit in a first direction; and
   propelling the windrower across a field of standing crop wherein the cutterbar mechanism severs the standing crop from the ground and the conditioner mechanism conditions the severed crop material prior to depositing on the ground in a windrow.

8. The method of claim 7, further comprising the steps of:
   wherein the first and second cutterbar drivers are mechanically connected through the cutterbar mechanism.

9. The method of claim 8, further comprising the step of:
   providing a pressure relief device for directing the flow of hydraulic fluid to bypass the conditioner driver when the conditioner driver stalls due to a clog of crop material in the conditioning rolls thereby preventing damage to said fluid circuit and the hydraulic power system.

10. The method of claim 9, further comprising the steps of:
    providing a conditioner driver configured for operation in a forward direction and an opposing reverse direction,
    configuring the hydraulic fluid circuit to provide pressurized hydraulic fluid to the conditioner driver in a manner to enable selective rotation of the conditioner driver in said forward direction or said reverse direction; and
    reversing the direction of the conditioner driver in order to clear the conditioning rolls of clogged crop material.

11. The method of claim 10, further comprising the steps of:
    providing a bypass loop having a selectively adjustable control valve in the hydraulic fluid circuit for diverting a selectively variable portion of the pressurized hydraulic fluid from the conditioner driver; and
    selectively adjusting the control valve to alter the rotational speed of the conditioner driver with respect to the speed of the cutterbar driver in order to optimize operation of the conditioner mechanism.

12. The method of claim 10, further comprising the steps of:
    providing a variable displacement hydraulic motor for the conditioner driver; and
    selectively varying the displacement of the hydraulic motor thereby varying the rotational speed of the conditioner driver independent of the flow of the hydraulic fluid in the fluid circuit and the speed of the cutterbar driver.

13. In an agricultural windrower having a tractor for supporting and propelling a header across a field of standing crop, the tractor having a hydraulic power supply for conveying motive power to the header, the header having a forwardly disposed cutting mechanism and a rearwardly disposed conditioner mechanism having conditioning rolls, the improvement in a drive mechanism for the cutting and conditioner mechanisms comprising:
   at least one cutterbar driver for providing rotational motive power to the cutterbar mechanism;
   a conditioner driver for providing rotational motive power to the conditioning rolls; and
   a hydraulic fluid circuit for conveying a flow of pressurized hydraulic fluid from the hydraulic power system through said at least one cutterbar driver and said conditioner driver, said at least one cutterbar driver and said conditioner driver being serially connected in said hydraulic fluid circuit, the hydraulic fluid circuit further having in parallel with the conditioner driver a bypass loop and a selectively adjustable control valve for diverting a selectively variable portion of said pressurized hydraulic fluid from said conditioner driver thereby enabling variation in the rotational speed of said conditioner driver independent of variation in the flow of the hydraulic fluid though the cutterbar driver.

14. The improvement of claim 13, further comprising a first cutterbar driver and a second cutterbar driver, said first and second cutterbar drivers being connected to said fluid circuit in a parallel arrangement and said conditioner driver is connected in series with said first cutterbar driver.

15. The improvement of claim 14, further comprising a pressure relief device for directing said flow of hydraulic fluid to bypass said conditioner driver when said conditioner driver stalls due to a clog of crop material in the conditioning rolls thereby preventing damage to said fluid circuit and the hydraulic power system.

16. The improvement of claim 15, wherein said conditioner driver is configured for operation in a forward direction and an opposing reverse direction, and hydraulic fluid circuit is configured for providing pressurized hydraulic fluid to said conditioner driver in a manner to enable selective rotation of said conditioner driver in said forward direction or said reverse direction.

17. The improvement of claim 16, wherein said conditioner driver is a variable displacement hydraulic motor thereby enabling variation in the rotational speed of said conditioner driver independent of variation in the flow of the hydraulic fluid in the fluid circuit.

18. A drive apparatus for a mower-conditioner mechanism in an agricultural harvester, the mower conditioner mechanism having a forwardly disposed cutterbar mechanism and a conditioner mechanism having conditioner rolls disposed rearwardly therefrom, the drive apparatus comprising:
 a cutterbar driver for providing rotational motive power to the cutterbar mechanism;
 a conditioner driver for providing rotational motive power to the conditioner rolls; and
 a hydraulic fluid circuit for conveying a flow of pressurized hydraulic fluid from a hydraulic power system through said at least one cutterbar driver and said conditioner driver, said at least one cutterbar driver and said conditioner driver being serially connected in said hydraulic fluid circuit; the hydraulic fluid circuit further having a bypass loop and a selectively adjustable control valve for diverting a selectively variable portion of said pressurized hydraulic fluid from said conditioner driver thereby enabling variation in the rotational speed of said conditioner driver independent of variation in the flow of the hydraulic fluid through the cutterbar driver.

19. The drive apparatus of claim 18, wherein said conditioner driver is configured for operation in a forward direction and an opposing reverse direction, and hydraulic fluid circuit is a closed circuit configured for providing pressurized hydraulic fluid to said conditioner driver in a manner to enable selective rotation of said conditioner driver in said forward direction or said reverse direction.

\* \* \* \* \*